Oct. 19, 1954 W. W. STOOKSBERRY 2,691,824
JET RUDDER ALIGNER
Filed Aug. 20, 1952 3 Sheets-Sheet 1
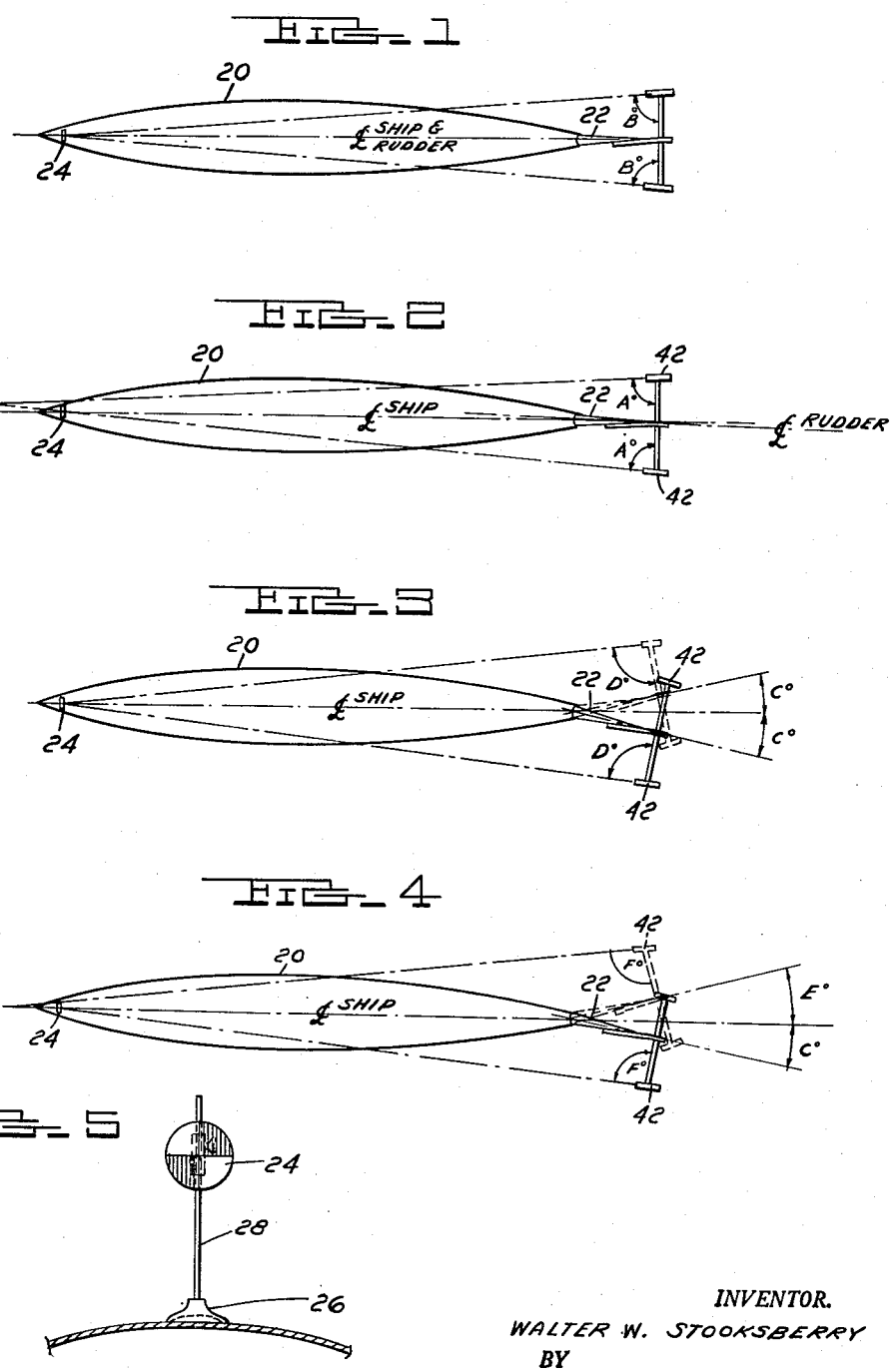
INVENTOR.
WALTER W. STOOKSBERRY
BY
Burton & Parker
ATTORNEYS Oct. 19, 1954          W. W. STOOKSBERRY          2,691,824
                         JET RUDDER ALIGNER
Filed Aug. 20, 1952                            3 Sheets-Sheet 2
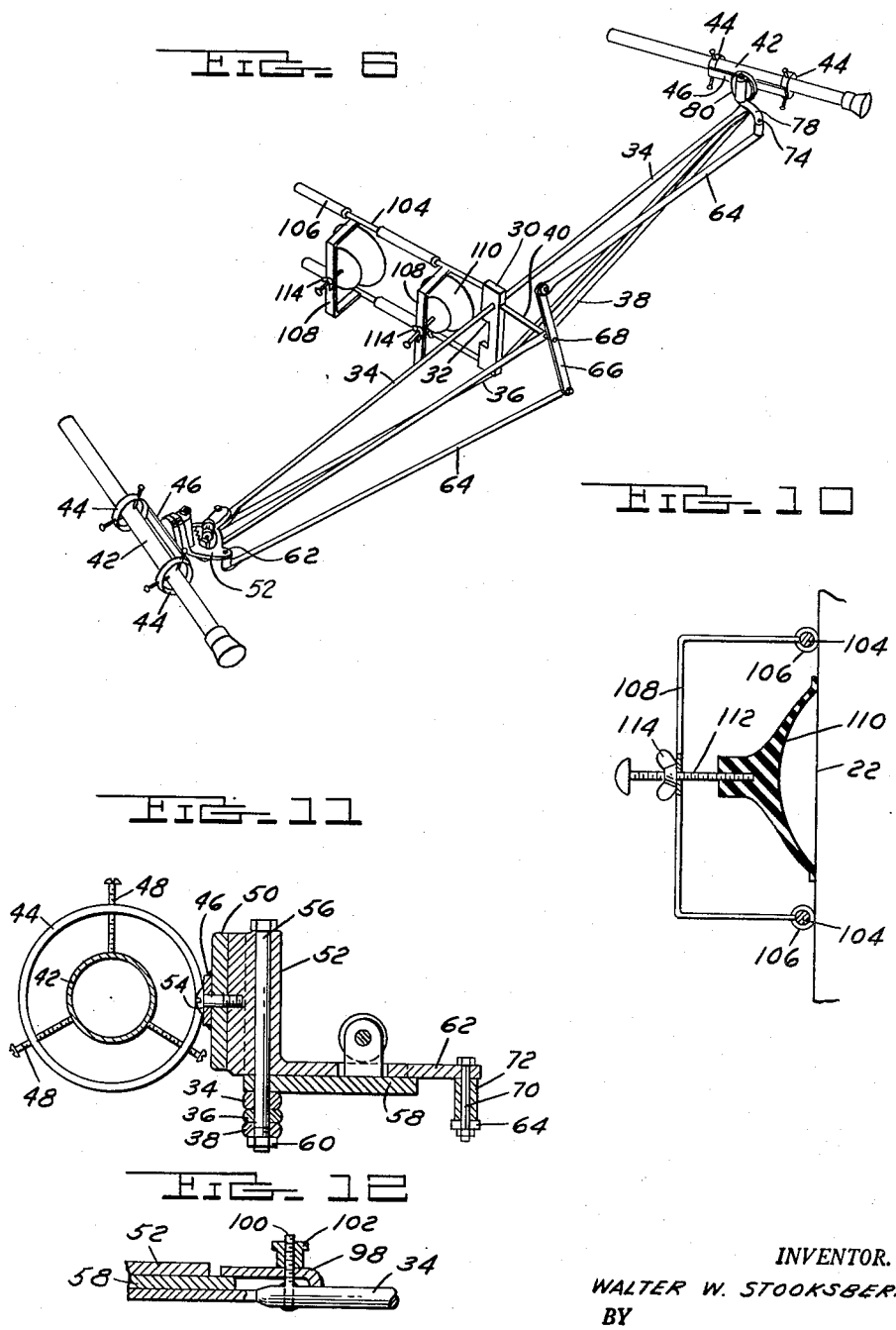
INVENTOR.
WALTER W. STOOKSBERRY
BY
Burton & Parker
ATTORNEYS

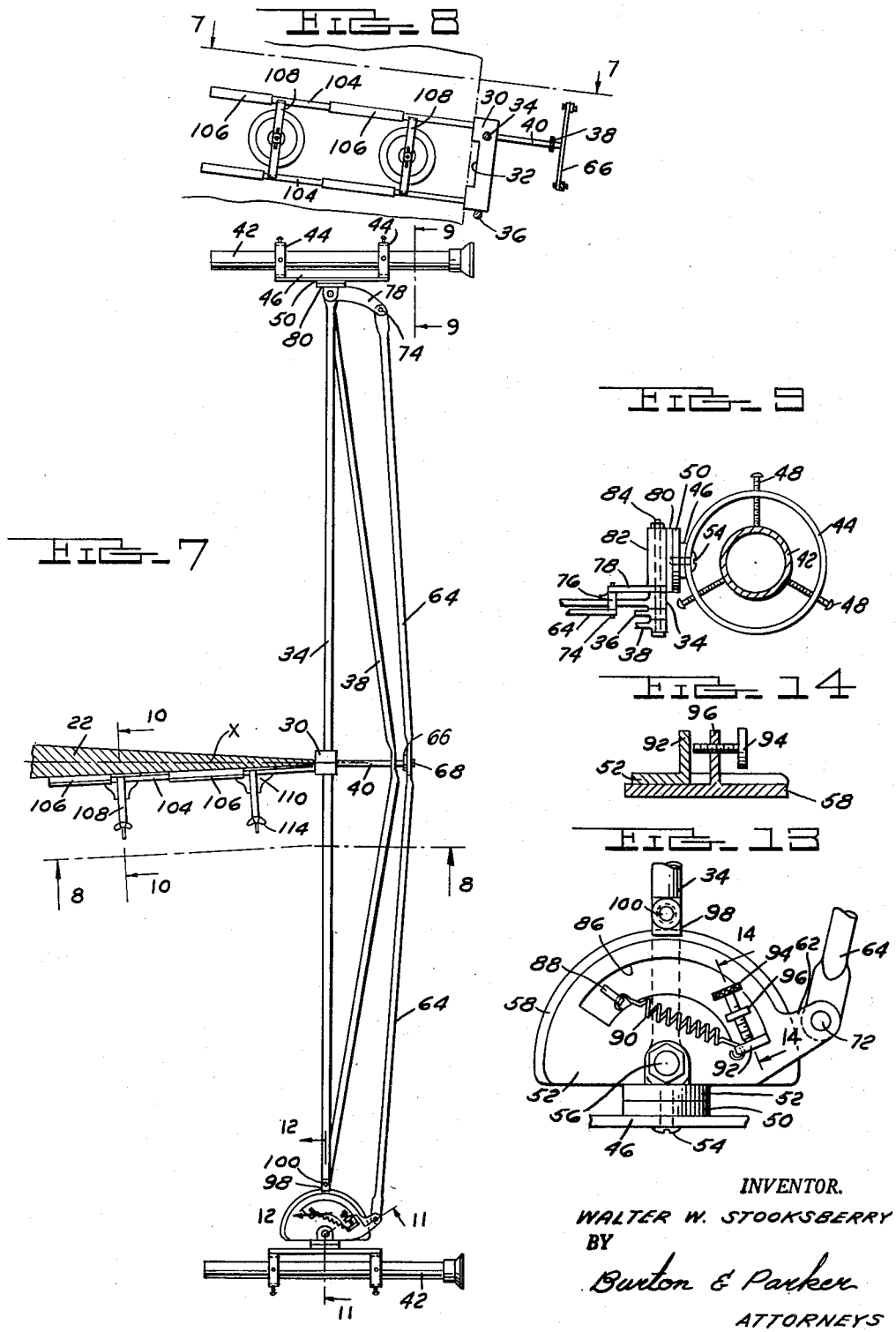

Patented Oct. 19, 1954

2,691,824

UNITED STATES PATENT OFFICE 2,691,824

JET RUDDER ALIGNER

Walter W. Stooksberry, Port Washington, N. Y., assignor to Kent-Moore Organization, Inc., Detroit, Mich., a corporation of Michigan Application August 20, 1952, Serial No. 305,354

5 Claims. (Cl. 33—66)

This device relates to an instrument for measuring rudder alignment of an aircraft. It is particularly designed to measure jet aircraft rudder alignment.

An object is to provide an instrument which is simple and easily operable and which may be employed by an operator to indicate whether the rudder is properly aligned with the center line of the ship. The instrument is so constructed that it indicates visually and simply to a workman whether the rudder is in alignment. It does not require any complicated mathematical computation following the making of the test but the indication is positive and easily understood.

The instrument may be readily applied to a rudder to make the test required to indicate its alignment. The instrument is further adapted to indicate whether the angle of swing stops are correctly positioned and the operation of the instrument to determine this is simply and readily accomplished.

The instrument is of simple construction and embodies a minimum number of operating parts. It is sturdy and of a character which would not get out of order easily. It is relatively inexpensive and easily operated to make the required tests to determine the neutral point and the extreme limits of rudder positions which correspond to the desired automatic pilot orientation positions of certain types of aircraft. Specifically these orientation positions are the position at which the rudder center line lies on the same center line as that of the aircraft's fuselage, and the two positions at which the angular travel from such center line is equal and also the extreme limits of travel both ways.

Due to the increased speed of jet aircraft rudder position settings with respect to automatic pilot orientation are becoming increasingly critical. There is therefore an increased need for means for establishing more accurate orientation than has heretofore been available.

Other objects, advantages and meritorious features of the invention will more fully appear from the following description, claims and accompanying drawings, wherein:

Fig. 1 indicates diagrammatically the instrument of this invention applied to a jet rudder properly aligned with the center line of the ship;

Fig. 2 indicates the instrument of this application applied to a jet rudder not properly aligned with the center line of the ship;

Fig. 3 indicates the instrument of this application applied to a properly aligned jet rudder but indicating the angular positions of swing limited by the stops;

Fig. 4 indicates the instrument of this application applied to a jet rudder where the angle of swing is inaccurate;

Fig. 5 schematically illustrates a target member which is used with the instrument;

Fig. 6 is a perspective of the instrument itself;

Fig. 7 is a top plan of the instrument attached to a rudder partly broken away and actually taken on line 7—7 of Fig. 8;

Fig. 8 is a fragmentary elevation taken on the line 8—8 of Fig. 7;

Fig. 9 is a transverse sectional view taken on the line 9—9 of Fig. 7;

Fig. 10 is a cross sectional view taken on the line 10—10 of Fig. 7;

Fig. 11 is a sectional view taken on the line 11—11 of Fig. 7;

Fig. 12 is a fragmentary sectional view taken on the line 12—12 of Fig. 7;

Fig. 13 is a fragmentary plan of the telescope supporting pivoted plates on one end of the frame of the instrument;

Fig. 14 is a fragmentary sectional view taken on the line 14—14 of Fig. 13.

In the first four figures of the drawing, there is shown schematically an aircraft fuselage 20 provided with a pivotally supported rudder 22 adapted to be swung to one side or the other as shown in Figs. 3 and 4. In these figures of the drawing the instrument of this invention is shown as attached to the rudder and a target element 24 is shown as mounted upon the center line of the aircraft forwardly of the rudder. This target 24 is shown in Fig. 5 as carried by a stand comprising a base 26 and an upright support 28. The target may be adjustably raised or lowered upon the support 28 so that it will be visible along a line from the rudder over the top of the fuselage. The functioning of the instrument in making the tests indicated in Figures 1 through 4 will be described later following a description of the construction of the instrument. The rudder itself is tapered rearwardly and the instrument shown is constructed to fit a rudder of a particular taper.

The instrument itself includes a frame which is shown most clearly in Figs. 6 and 7. Upon opposite ends of the frame are mounted telescope assemblies. The frame comprises a block 30 adapted to engage the after edge of the rudder 22, as shown in Fig. 7. This block is cut away at 32 so that spaced upper and lower points on the block may always be engaged with the after edge of the rudder. One frame tube or rod 34 is secured to and extends transversely with respect to the block 30. This frame rod is supplemented by a truss rod 36 which is shown as extending generally lengthwise the rod 34 and bent to engage the lower end of the block as shown in Fig. 6. A second truss rod 38 is provided. This rod 38 extends generally lengthwise the rod 34 and the truss rod 36 and is bent rearwardly and held spaced rearwardly of the block by a stud 40. This frame rod 34 and the two truss rods 36 and 38 provide a substantially rigid frame assembly. The ends of these rods 34, 36 and 38 are secured together as hereinafter described.

A telescope assembly is pivotally supported at each end of the frame. A telescope 42 is supported for adjustment between and within a pair of rings 44. These rings are carried by a backing plate 46 as shown particularly in Figs. 6, 7 and 11. Each ring is provided with three adjustment screws 48. The telescope may be lined up within the rings by manipulation of these screws. Each backing plate 46 is provided with a bearing plate portion 50 which is secured to the backing plate by welding or the like, as shown in Fig. 11.

At one end of the frame assembly, which is the end from which the linkage that swings the telescopes is manipulated and locked in position, the telescope assembly through the bearing plate 50 is pivoted to an angular supporting plate 52 by an adjustment screw 54. This construction is shown particularly in Fig. 11. The telescope may be swung in a vertical plane about the screw 54 as a pivot. The angular plate 52 which supports the telescope is pivoted by a bolt 56 to a lower plate 58 for swingable movement over such lower plate and relative thereto, or for swingable movement as a unit with such lower plate about the bolt 56 as a pivot. This bolt extends through the three frame truss rods 34, 36 and 38 and a nut 60 upon bolt 56 secures this end assembly together.

The upper angular telescope supporting plate 52 has an arm 62 which projects beyond the lower plate as shown in Fig. 11. Linkage comprising a pair of links 64 pivotally connected to a cross arm 66 which cross arm is pivoted at 68 upon an extension of the stud 40 as shown in Figs. 6 and 7 connects the two telescopes together for simultaneous swinging movement. One link 64 has its outer end connected by a pin 70 which extends through a bearing 72 with the arm 62 of the plate 52 as shown in Fig. 11. The other link 64 has its outer end connected by a pin 74 which extends through a bearing 76 with a crank arm 78 which arm is fixed to plate 80.

This plate 80 serves as a support for the telescope at such end of the frame. The telescope assembly at such end of the frame is similar to the telescope at the opposite end of the frame. To the backing plate 46 of this telescope assembly there is secured a bearing plate 50. This bearing plate 50 is pivoted to the supporting plate 80 by a screw 54 to provide for up and down swinging movement of the telescope assembly. The plate 80 has a pintle receiving portion 82 through which a bolt 84 extends. This bolt 84 serves the same purpose as the bolt 56 at the opposite end of the assembly namely the bolt 84 serves as the pivot for the plate 80 of which the arm 78 is a part. The bolt 84 also secures the rods 34, 36 and 38 together as shown in Fig. 9 in a manner similar to that shown in Fig. 11 in connection with the bolt 56 at the opposite end of the instrument frame.

The support for the telescope which includes the angular upper plate 52 and the lower plate 58 is the support which is provided with the adjustment and locking mechanism. The plate 52 is provided with an arcuate slot 86 shown in Fig. 13. A lug 88 projects from the plate 58 up through this slot. A tension spring 90 is connected at one end with the lug 88 and at the opposite end with a lug 92 which lug is punched upwardly from the plate 52. This spring tensions the plate 52 toward an adjustment screw 94 which is shown in Fig. 13 as bearing against the lug 92. This adjustment screw 94 is carried by a lug 96 mounted on the plate 58. The lug 96 extends upwardly through the slot 86. The adjustment screw serves as a micrometer adjustment screw to adjust the angular position of the plate 52 with respect to the plate 58. The spring serves as stated to hold the plate 52 against the end of the screw. The plate 52 therefore has a permitted relative angular adjustment with respect to the plate 58 about the bolt 56.

A releasable latch plate 98 is supported upon a threaded pin 100 which is carried by the rod 34. One end of this latch plate overhangs the margin of the lower plate 58 without engaging the upper plate 52 as shown in Figs. 12 and 13. A thumb nut 102 is threaded on the pin 100 and serves to tighten the plate 98 down against the margin of the plate 58 to hold such plate 58 against pivotal movement. The nut may be released so as to release the plate 58 for swinging movement.

The instrument as an assembly is adapted to be secured to one side of the rudder of an aircraft so as to extend transversely of the rudder and normal to the center line thereof. In Fig. 7 a rudder 22 is shown as tapered fore and aft the center line of such rudder which is indicated by the dotted line X. A pair of positioning rods 104 are secured in spaced relationship to the block 30 to extend forwardly thereof. These rods extend forwardly of the block at such an angle thereto that when the block is brought against the after edge of the rudder 22 and the rods lie along one side surface of the rudder the instrument itself will be supported not only transversely of the rudder but normal to the center line thereof. Each of the rods 104 is shown as provided with a pair of padded portions 106 and the two rods are held braced apart by frame members 108, as shown in Figs. 6, 8 and 10. The rods therefore extend forwardly from the block 30 at an angle to the center line of the rudder when the block is positioned against the after edge of the rudder. It is such an angle as determined by the taper of the rudder. The instrument therefore is designed to fit a particular tapered rudder. The frame elements 108 carry vacuum cups 110 mounted on threaded screws 112. Wing nuts 114 are threaded upon the screws to hold the screws at adjusted positions. The vacuum cups are adapted to be engaged with the side of a rudder to hold the instrument in place thereagainst, all as shown in Fig. 7.

In order to test whether a rudder on an aircraft is properly positioned, an instrument of the application may be mounted upon the side of the rudder as shown in Fig. 7 with the upper and lower ends of the block 30 engaging the after edge of the rudder. The instrument is held against the side of the rudder by the vacuum cups 110. The rudder being tested is one which has the taper designed to fit the particular instrument so that the instrument when so supported upon the rudder will extend not only transversely of the rudder as shown in Figs. 6 and 7 but will be disposed normal to the center plane of the rudder. The two telescopes carried by the instrument are lined up vertically so that the line of sight of each is on a line which will clear the top of the fuselage and focus upon the target 24. This target 24 has been placed on the center line of the fuselage of the ship.

Initially the two telescopes may be substantially parallel so that neither will bear directly upon the target. The telescope at the end of the instrument which is the operating end and provided with the locking mechanism and the micrometer screw 94 is then moved through a horizontal plane to focus upon the target. When this telescope is thus moved the telescope at the other end of the instrument will be correspondingly moved by the linkage 64. The two telescopes move simultaneously and through equal arcs but in opposite directions. If the rudder is correctly disposed both telescopes are focused on the target. If the center line of the rudder is on the center line of the aircraft and the target is on the center line of the aircraft forwardly of the rudder the two telescopes will have to focus on the target at the same time, it being understood that the two telescopes are spaced equally on opposite sides of the center plane of the rudder and with rod 34 perpendicular thereto.

Fig. 1 shows such an operation with a rudder having its center line on the center line of the ship. Fig. 2 shows a situation where the center line of the rudder is not on the center line of the ship and while one telescope is focused upon the target the other telescope is not focused thereon. This indicates that the center line of the rudder is not aligned with the center line of the ship and correction is required.

In addition to applying the instrument to line up the center line of the rudder with the center line of the ship, the instrument is also employed to determine the accuracy of the setting of the limit stops. Limit stops are provided to limit the swing of the rudder in both directions. These limit stops should be placed so that the rudder will swing through equal arcs in both directions. The instrument may be employed to determine whether the limit stops are so positioned. With the instrument mounted on the rudder as described, the rudder is swung to one side against its limit stop on such side. The telescope at the end of the instrument toward which the rudder is swung is then focused on the target. The rudder is then swung in the opposite direction through the permitted arc as determined by the limit stop on the opposite side. The telescope at such opposite end of the instrument should then focus on the target. If it does line up with the target as shown in Fig. 3, the limit stops are properly positioned.

In Fig. 3, in one position of the rudder the instrument is shown in solid outline; in the other position of the rudder the instrument is shown in dotted outline. If the two limit stops are not similarly and correctly positioned it will be found that after one telescope has been lined up with the target when the rudder is swung in the opposite direction a telescope at such end of the instrument will not line up on the target. Such result will indicate the necessity of correcting the position of the limit stops.

What I claim is:

1. An instrument for measuring aircraft rudder alignment comprising a frame provided with a part adapted to engage on the aft edge of the rudder and means adapted to engage one side of the rudder to support the frame extending transversely thereof and normal to the center line of the rudder, a pair of telescopes pivotally supported on the frame spaced equally oppositely thereon from said part for swinging movement to converge their lines of sight upon a point on the center line of the aircraft forwardly of the rudder, linkage connecting said telescopes together whereby said two telescopes will swing equally at all times to converge their two lines of sight upon a point forwardly of the rudder, said two telescopes also being so supported that they may be swung to raise and lower their lines of sight.

2. An instrument for measuring rudder alignment comprising a frame having a part adapted to engage the aft end of a rudder and having positioning rods extending forwardly from said part and at such an angle thereto that when the rods are disposed against one side of the rudder the frame will be positioned to extend transversely of the rudder and normal to its center line, means cooperating with the rods to secure the frame to the rudder in said position, a pair of telescopes pivotally supported on the frame spaced equally oppositely thereon from said part, linkage coupling said telescopes together for swinging movement in unison to swing their lines of sight through equal arcuate increments in opposite directions to converge upon a point forwardly of the rudder, and means coupled with each telescope to swing the same to raise and lower its line of sight.

3. An instrument for measuring rudder alignment comprising a frame having a part adapted to engage the aft end of a rudder and having positioning rods extending forwardly from said part at such an angle thereto that when the rods are disposed against one side of the rudder the frame will be positioned to extend transversely of the rudder and normal to its center line, means co-operating with the rods to secure the frame to the rudder in said position, a pair of telescopes pivotally supported on the frame spaced equally oppositely thereon from said part, each of said telescopes so pivotally supported as to be swung through a horizontal plane and through a vertical plane, linkage connecting said two telescopes to swing together through equal arcuate increments in their horizontal plane to converge their lines of sight on a point upon the center line of the aircraft forwardly of the rudder, said linkage including a pair of telescope supporting plates pivoted on opposite ends of the frame, said telescope supporting plates connected together by the linkage to swing equally at all times in unison upon actuation of the linkage, the telescope supporting plate assembly at one end of the instrument including a second pivotally supported plate disposed beneath the telescope supporting plate and swingable with the telescope supporting plate and provided with releasable locking means operable to lock it against pivotal swinging movement of the telescope supporting plate relative thereto.

4. An instrument for measuring rudder alignment comprising a frame having a part adapted to engage the aft end of a rudder and having positioning rods extending forwardly from said part at such an angle thereto that when the rods are disposed against one side of the rudder the frame will be positioned to extend transversely of the rudder and normal to its center line, means co-operating with the rods to secure the frame to the rudder in said position, a pair of telescopes pivotally supported on the frame spaced equally oppositely thereon from said part, linkage connecting said telescopes to swing together through equal arcuate increments to converge their lines of sight on a point upon the center line of the aircraft forwardly of the rudder, said linkage including a pair of telescope supporting plates pivoted on opposite ends of the frame, said telescope supporting plates connected together by linkage to swing equally at all times in unison upon actuation of the linkage, a second pivotally supported plate at one end of the frame associated with the telescope supporting plate, means operable to releasably lock said second plate and associated telescope supporting plate together to swing as a unit, said two plates being relatively angularly adjustable about their pivots, and means operable to releasably hold said plates at angular positions of adjustment and being yieldable to permit independent swinging movement of the telescope supporting plate relative to the second plate.

5. An instrument for measuring rudder alignment comprising a frame having a part adapted to engage the aft end of a rudder and having positioning rods extending forwardly from the frame at such an angle thereto that when the rods are disposed against one side of the rudder the frame will be positioned to extend transversely of the rudder and normal to its center line, means co-operating with the rods to secure the frame to the rudder in said position, a pair of telescopes pivotally supported on the frame spaced equally oppositely thereon from said part, linkage connecting said telescopes to swing together through equal arcuate increments to converge their lines of sight on a point upon the center line of the aircraft forwardly of the rudder, said linkage including a pair of telescope supporting plates pivoted on opposite ends of the frame, said telescope supporting plates connected together by linkage to swing equally at all times in unison upon actuation of the linkage, a second pivotally supported plate at one end of the frame associated with the telescope supporting plate at such end, means operable to releasably lock the telescope supporting plate at adjusted angular positions with respect to the second plate whereby both plates may swing as a unit, said locking means yieldable to permit the telescope supporting plate to swing independently of the second plate, and means operable to releasably lock the second plate at adjusted angular positions.

References Cited in the file of this patent

UNITED STATES PATENTS

| Number | Name | Date |
| --- | --- | --- |
| 735,497 | Griffith | Aug. 4, 1903 |
| 1,048,570 | Murphy | Dec. 31, 1912 |
| 1,267,323 | Kleidman | May 21, 1918 |
| 1,288,713 | Simanik | Dec. 24, 1918 |
| 2,301,154 | Tilton | Nov. 3, 1942 |